Patent text begins

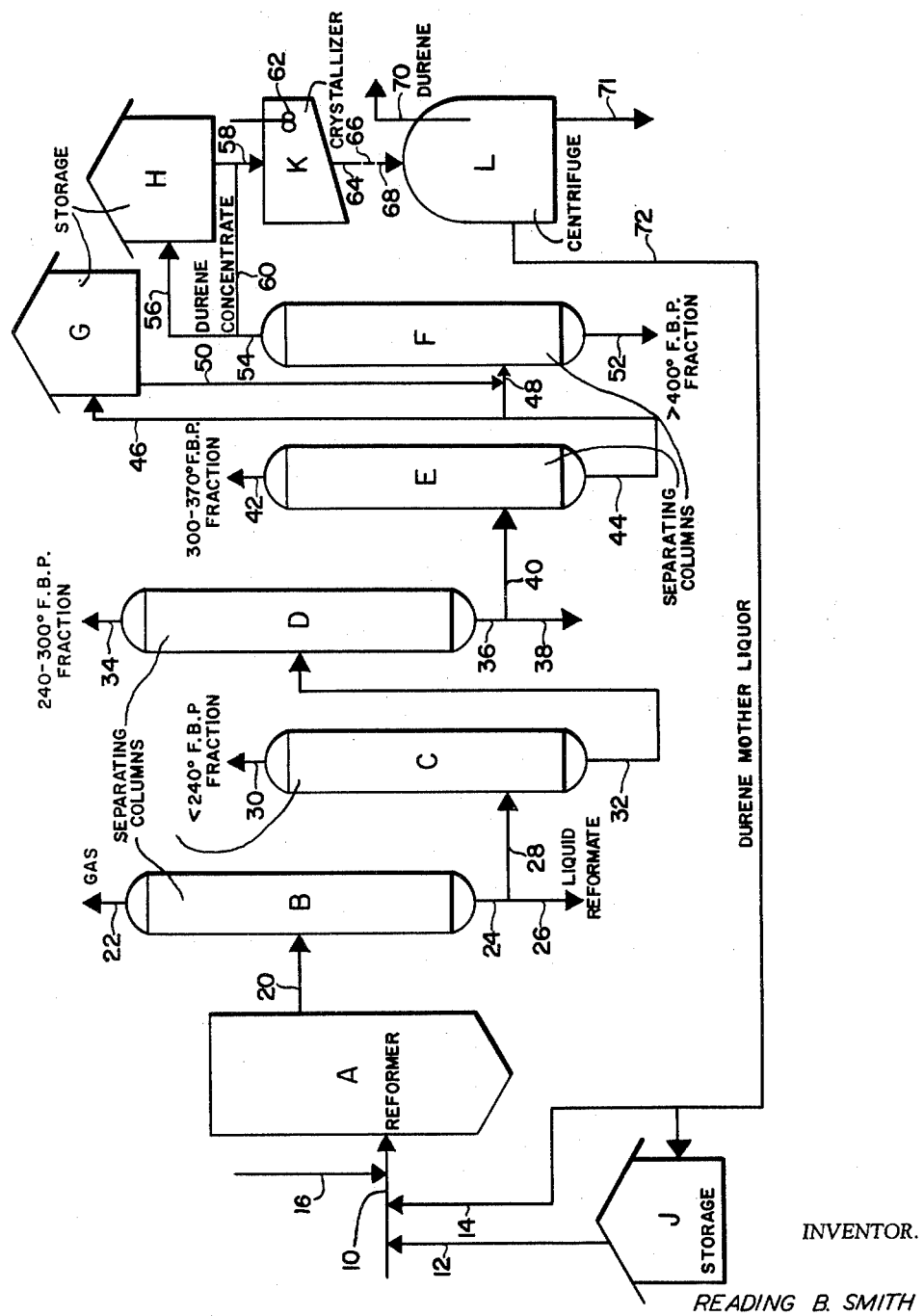

United States Patent Office 3,150,197
Patented Sept. 22, 1964

3,150,197
PROCESS FOR THE PRODUCTION OF DURENE
Reading B. Smith, Flossmoor, Ill., assignor, by mesne assignments, to Sinclair Research, Inc., New York, N.Y., a corporation of Delaware
Filed Dec. 15, 1959, Ser. No. 859,800
4 Claims. (Cl. 260—673.5)

This invention is a method for increasing the amount of durene recovered from a reformer effluent stream and comprises adding to the reformer a durene crystallization mother liquor slack in durene. The durene content of the resulting reformer effluent is increased, and, in turn, a greater quantity of durene is recovered in the crystallization operation.

Durene is produced, for example, in admixture with other hydrocarbons by vapor-phase reforming of a straight-run heavy naphtha, for example boiling principally above about 250° F., by alkylating aromatics, etc. A review of methods of durene manufacture and utilization appears in "Chemical Week," vol. 85, Number 6, August 8, 1959, pages 39 to 44. The first above-named method is designed primarily to produce reformate fractions suitable for use as blending agents to provide gasolines of improved octane ratings. The higher boiling portions of the reformate, while suitable for use as fuel, contain modest amounts of durene which it is worthwhile to recover. The durene is found in reformate fractions boiling primarily between about 350 to 410° F. and generally the greater quantity of the durene is in the approximate 370 to 400° F. boiling range material. Fractions in the latter range are mixtures of mostly aromatic hydrocarbons and may contain minor amounts of naphthenes and paraffins. The aromatics usually include durene and the close boiling durene homologs, isodurene and prehnitene, from which it is difficult to separate the durene. Since durene differs from its homologs more in its melting point than any other physical characteristics, it generally is separated by freezing it out from its mixture.

In the recovery of durene from its associated hydrocarbons, one processing scheme employs a low-temperature crystallization of the durene from the hydrocarbon mixture boiling in the range from about 370 to 400° F. and comprising, to a great extent, $C_{10}$ aromatics. The concentration of durene in this mixture, when obtained from reformate, is usually in the range of about 10 to 25% by weight and when the mixture is chilled, the first crystals will form at a temperature from about $-10$ to $+45°$ F. As this temperature is lowered, pure durene will crystallize from the mixture to fairly low temperatures, say about $-80°$ F. The filtration of durene crystals from the mother liquor leaves a filtrate containing isodurene, prehnitene, at least some durene and other hydrocarbons close-boiling to durene.

This invention is based on the discovery that when such a filtrate is added with the naphtha feed to the reforming operation, the amount of durene recovered by crystallization is significantly increased. The increase apparently is due at least in part to the cracking of $C_{10}$ aromatic constituents other than tetramethyl benzenes in the reformer to lower-boiling constituents effectively reducing the amount of non-durene constituents which must be released from the crystallization stage as filtrate. The filtrate contains a certain concentration of durene, this concentration being fixed by a solubility relationship. Hence, a reduction in filtrate results in a decrease in the amount of durene dissolved in filtrate and an increase in the amount of durene recoverable as a solid. The increase in durene recovered is also due in part to the effect which a recycle of non-durene $C_{10}$ aromatics has upon the conversion of fresh naphtha feed to durene. The recycle, which is lean in durene, preferentially drives the conversion of fresh naphtha $C_{10}$ aromatic precursors in the direction of durene by increasing concentrations of non-durene isomers in the reformer reaction zone. As an example, a comparison of results indicated that in one situation the use of about one part filtrate recycle containing 6.5% durene with 76 parts fresh reformer naphtha feed reduced the quantity of non-durene constituents in the recycle-free portion of the 370–400° F. fraction of reformate by about 37%. The durene quantity in this same recycle-free portion of the 370–400° F. fraction did not suffer a loss but in fact increased by about 5%. As a result of this, loss of durene to filtrate was reduced by about 67% and the net durene recovery by crystallization at about $-30°$ F. was increased by about 45%.

The process of this invention comprises passing to the reformer about 0.5 to 10 volume percent of a durene crystallization mother liquor or filtrate and subjecting the naphtha and filtrate to reforming conditions. The amount of filtrate preferably comprises about 1 to 5% of the total amount of straight-run naphtha and filtrate. The filtrate boils primarily in the approximate 350 to 410° F. range, preferably in the range of about 370 to 400° F.

The recovery of durene product becomes easier as the quantity of non-durene constituents in the 370–400° F. fraction of reformate produced from fresh reformer naphtha is decreased. The greater the amount of filtrate recycled through the reformer, the greater is this reduction in the non-durene constituents. However, since durene is usually merely a by-product of the reforming operation while lower boiling gasoline components are the prime object, the amount of mother liquor added is generally minimized so as not to sacrifice production of the more desirable gasoline components too severely.

In the reforming operation, a number of reactions take place, such as dehydrogenation, dehydrocyclization, isomerization and hydrocracking. The virgin feed is generally a straight-run naphtha boiling range hydrocarbon. This feed is contacted with a reforming catalyst, for instance, a platinum metal-alumina catalyst, in the presence of free hydrogen under conditions which provide a substantial increase in the octane number of the petroleum hydrocarbon material. The straight-run hydrocarbon feedstocks charged to the reformer containing the reforming catalyst are primarily the straight-run petroleum fractions boiling in the gasoline and naphtha ranges, for instance, in the range from about 175 to 425° F., but somewhat higher or lower boiling constituents can be included if desired. Preferably, the feedstock boils primarily in the range of about 200 to 400° F. In this invention, the naphtha contains a substantial portion; for instance, at least about 10 volume percent, preferably at least about 20%, of $C_{10}$ hydrocarbons boiling in the approximate 300 to 410° F. range. Also, the feedstock will usually boil over a range of at least about 100° F. Although the hydrocarbons passing to the reforming system are composed of predominantly straight-run naphtha materials, minor amounts of additional components can be included.

Reaction conditions observed or maintained in the reforming operation include temperatures from about 750 to 1000° F., preferably about 850 to 975° F., and pressures from about 50 to 1000 p.s.i.g., preferably about 150 to 500 p.s.i.g. The free hydrogen supplied to this reaction system usually is in the form of hydrogen-rich recycle gases and generally provides about 2 to 20 moles of hydrogen per mole of hydrocarbon feed; preferably, this ratio is about 4 to 10/1. The space velocity usually lies in the range of about 0.5 to 10 WHSV (weight of feed per weight of catalyst per hour) preferably about 2 to 5 WHSV.

The platinum metal-alumina catalysts which can be employed in the method of this invention include a number of compositions. Generally, the platinum metal is a minor amount of the catalyst, e.g. about 0.1 to 1.5 weight percent of the final composition. Platinum is the most commonly employed metal in these reforming catalysts although other useful platinum metals include rhodium, palladium, and iridium which, along with platinum, are the face centered cubic crystallite types of the platinum family as distinct from the hexagonal types, ruthenium and osmium, which appear to be of lesser value.

These catalysts can be made by a number of procedures but a particularly effective catalyst is one in which the alumina is obtained through calcination of an alumina hydrate containing at least about 65 weight percent of trihydrate and about 5 to 35 weight percent of alumina monohydrate and/or amorphous alumina forms, and, if desired, having a surface area of about 350 to 550 square meters per gram (BET method) when in the virgin state. The minor amount of platinum metal in the catalyst is usually present in finely divided form and is not detectable by X-ray diffraction techniques. Also, these catalysts are advantageously prepared to afford about 0.10 to 0.5, preferably about 0.15 to 0.3 cc./gram of their pore volume in pores of about 100 to 1000 Angstrom units in size. U.S. Patents Nos. 2,838,444 and 2,838,445 describe the preparation of such catalysts. If desired, the catalyst can contain minor amounts of additional materials, for instance, promoting components particularly those acidic in nature, such as silica and fluoride. Such promoting components are usually less than 10 weight percent of the final calcined catalyst. Other reforming catalysts such as molybdena-alumina can be used but frequently to less advantage.

The reforming catalyst can be employed in any type of reaction system desired, for instance, moving or fluidized bed, regenerative or non-regenerative, etc., but advantageously the catalyst is disposed as a fixed bed. In the later type of operation, the size of commercial units is such that essentially adiabatic reaction systems must be employed and in view of this and the endothermic nature of the reforming operation the catalyst is placed in fixed beds in a plurality of reactors, each of which is preceded by means for heating its charge. In fixed bed operations, the catalyst is in macrosize form, that is, particles generally at least about $\frac{1}{16}''$ in length and diameter and preferably not exceeding about $\frac{3}{8}''$ in diameter. Particularly when such particles are provided by extrusion, their length may be up to about 1" or more. If the catalyst reforming system be of the regenerative type, it can be arranged so that the catalyst of all of the reactors can be regenerated simultaneously or individually. Other variations in the reaction system can be made according to the desires of the operator.

The process of this invention can be better understood by reference to the accompanying schematic drawing which represents a conventional reformer system with means for separating durene and with added equipment suitable for practicing this invention.

The drawing shows a reformer A and a series of separating columns B, C, D, E and F as well as a series of storage tanks G, H and J, a crystallizing tank K and a filter, preferably a centrifuge, L. It is to be understood that the reformer A may be a series of reforming vessels with their associated heaters, etc., and the system may contain more or fewer fractionating columns or storage tanks than those shown and may comprise a plurality of crystallizers and liquid-solid separating devices of the same or different types. Fresh naptha reformer feed is led to the system by the line 10. In the process of this invention the durene-containing mother liquor from crystallization and filtration is conducted to the system by lines 12 and/or 14. The reformer A contains catalyst particles, as described above, and is provided with line 16 for the introduction of hydrogen-containing gas. The reformate, after flushing to remove $H_2$ and light hydrocarbon gases, leaves through line 20 which conducts the stream to column B where the stream is allowed to cool and condense.

In column B the hydrocarbon stream may be freed of propane and other normally gaseous hydrocarbons which are released from the system by the line 22. Liquid reformate is conducted from the column B by line 24 and a portion, for instance, about 10 to 25%, is led from the system through line 26 for use, suitably as a gasoline blending agent. The remainder of the liquid reformate is conducted by line 28 to fractionating column C where the light reformate fraction, boiling below about 240° F. may be separated from the stream and conducted from the system by line 30 for use suitably as a gasoline blending component. This light reformate fraction may, for instance, comprise about 25 to 50% by volume of the stream entering column C. Line 32 conducts the remaining portion of the hydrocarbon stream to column D which separates out as overhead the fraction boiling below about 300° F. This fraction is conducted from the system by line 34 to use, advantageously as a feed for solvent extraction of aromatics, etc., for petrochemical and other uses. The fraction may contain about 30 to 70% of the feed to fractionator D. The fraction boiling above about 300° F. is conducted from D through line 36 where the fraction may be split, with a portion being conducted by line 38 to other use. The other portion may be fed by line 40 to fractionator E which separates out materials boiling below about 370° F. which are removed from the system by line 42. This fraction may comprise about 60 to 90% of the hydrocarbon feed to fractionator E. The materials boiling above about 370° F. are led by line 44 to the storage tank G using line 46, or directly to the fractionator F using line 48. Stored hydrocarbons are brought to fractionator F by lines 50 and 48.

In column F, materials boiling above about 400° F. (heavy reformate) are separated from the stream through line 52 for further use. The 370–400° F. fraction, also called durene concentrate, is led by lines 54 and 56 to storage tank H and thence by line 58 to crystallizer K, or the durene containing fraction may be led directly from line 54 to line 58 by line 60.

In crystallizer K, which advantageously is provided with the stirrer 62, a scraper and suitable refrigeration means not shown, the temperature of the 370–400° F. boiling range fraction is lowered to crystallize durene. The resulting slurry, containing durene crystals in a mother liquor slack in durene is passed from the crystallizer by the line 64.

The slurry may be passed through a series of crystallization, filtering, leaching, remelting, etc., zones, as represented by the dashed line 66, before it is led to the filter L by the line 68. L may be taken to represent a single filtering zone, or a composite of filtering zones the net result of which is to separate out a cake of durene crystals which is removed by line 70 to further purification or to any one of the many ultimate uses known for durene. This filtration also produces a filtrate, boiling in the 370–400° F. range and slack in durene. This filtrate in a conventional process is all removed from the processing stream as represented by the line 71. In the process of this invention, however, all or part of the filtrate is led by line 12 or directly through line 14 to the fresh reformer feed line 10 as a recycle stream joining naphtha reformer feed.

EXAMPLE I

A reforming operation was performed by feeding to the reformer 20,000 b./d. of naphtha with 425 b./d. of durene crystallization filtrate boiling in the 370–400° F. range and containing about 4 to 8% durene along with about 89 to 93% of other $C_{10}$ aromatics. The fresh feed, a straight-run naphtha, is obtained by distillation from crude oil, and the naphtha has an ASTM distillation boiling range of about 200 to 400° F., a RON (neat) of about 50 and a gravity API 60° F. of about 56.

The naphtha and mother liquor are fed to a reforming unit containing three essentially adiabatic reactors each having a fixed bed of platinum-alumina reforming catalyst. This system is equipped with means for heating the charge to each reactor and the heaters and reactors are arranged for serial flow. The catalyst employed is a platinum-alumina reforming catalyst containing about 0.6 weight percent platinum, and described in U.S. Patent No. 2,838,444 listed above. The inlet temperature of the feed to each of the three catalyst beds are 940° F., while the pressure is about 500 p.s.i.g. Free hydrogen is supplied to the feed passing to the heater before the first reactor. The molar ratio of hydrogen-rich gas (72.7% $H_2$)/hydrocarbon feed is approximately 5.5/1, while the overall space velocity is about 2.34 WHSV. The effluent from the last reactor is conveyed to a flash drum operating at 500 p.s.i.g. and is then treated or depropanized to remove $C_3$ and lighter hydrocarbons by distillation.

The reformate contains 628 b./d. of a 370–400° F. fraction, which fraction contains 94 b./d. of durene. The reformer effluent is passed through a series of fractionations to isolate the durene concentrate. After fractionation, the 370–400° F. fraction, comprising about 460 b./d. and containing about 64 b./d. of durene, is fed to the crystallization unit. About 425 b./d. of filtrate is produced. No filtrate is released as a product stream, the total filtrate being recycled through the reformer. About 36 b./d. is yielded as a 98% durene product stream.

EXAMPLE II

A reforming and fractionation operation is performed as in Example I, with the exception that 264 b./d. of the durene crystallization filtrate is contained in the 20,000 b./d. reformer feed.

The reformate contains 531 b./d. of a 370–400° F. fraction, which fraction contains 79 b./d. of durene. After fractionation, the 370–400° F. fraction, comprising about 386 b./d. and containing about 52 b./d. of durene, is fed to the crystallization unit. 357 b./d. of filtrate is produced, of which 264 b./d. is recycled back to reformer feed and 93 b./d. is removed from the system as filtrate. About 29 b./d. is yielded as a 98% durene product stream.

EXAMPLE III

When 20,000 b./d. of the naphtha feed described above is fed to the same reforming operation without mother liquor being added, the reformate contains 424 b./d. of a 370–400° F. fraction which fraction contains 59 b./d. of durene. After fractionation and the removal of slip streams, the 370–400° F. fraction comprising 305 b./d. and containing 38 b./d. of durene is fed to the recrystallization unit. About 285 b./d. is yielded as filtrate and about 20 b./d. is yielded as a 98% durene product stream. Table I below reports on the results of these runs in terms of flow through the lines of the system, following the numbering scheme of the drawing.

Table I

| Example | | I | II | III |
|---|---|---|---|---|
| Flow through line (bbl.): | | | | |
| 12 | Total | 425 | 264 | 0 |
| | 370–400° F. Fraction | 425 | 264 | 0 |
| | Durene | 28 | 17 | 0 |
| 10 | Total | 20,000 | 20,000 | 20,000 |
| | Percent Filtrate in Feed | 2.1 | 1.3 | 0 |
| 20 | Total | 19,720 | 19,620 | 19,500 |
| | 370–400° F. Fraction | 628 | 531 | 424 |
| | Durene | 94 | 79 | 59 |
| 26 | Total | 3,330 | 3,250 | 3,150 |
| | 370–400° F. Fraction | 122 | 101 | 79 |
| | Durene | 18 | 15 | 11 |
| 28 | Total | 13,850 | 13,850 | 13,850 |
| | 370–400° F. Fraction | 506 | 430 | 345 |
| | Durene | 76 | 64 | 48 |
| | Wt. Percent Durene | 15.0 | 14.9 | 13.9 |
| 40 | Total | 4,460 | 4,460 | 4,460 |
| | 370–400° F. Fraction | 506 | 430 | 345 |
| | Durene | 76 | 64 | 48 |
| 42 | Total | 3,640 | 3,685 | 3,740 |
| | 370–400° F. Fraction | 26 | 24 | 20 |
| | Durene | 10 | 10 | 8 |
| 48 | Total | 820 | 771 | 720 |
| | 370–400° F. Fraction | 480 | 406 | 325 |
| | Durene | 66 | 54 | 40 |
| 52 | Total | 360 | 385 | 415 |
| | 370–400° F. Fraction | 20 | 20 | 20 |
| | Durene | 2 | 2 | 2 |
| 58 | Total (370–400° F. Fraction) | 460 | 386 | 305 |
| | Durene | 64 | 52 | 38 |
| 70 | Total (98% Durene) | 36 | 29 | 20 |
| 71 | Total (6.5% Durene) | 0 | 93 | 285 |
| 72 | Total (6.5% Durene) | 425 | 357 | -------- |

It is thus seen that the addition to the naphtha feed to the reformer of the durene filtrate significantly increases the yield of durene from the subsequent filtration.

It is claimed:
1. A process for increasing the durene obtained from a petroleum straight-run naphtha having at least about 10 volume percent $C_{10}$ hydrocarbons boiling in the approximate 300 to 410° F. range which comprises contacting said naphtha in a reforming zone with a platinum metal-alumina catalyst at a temperature of about 850–1000° F. and a pressure of about 150–500 p.s.i.g. in the presence of free hydrogen to obtain a liquid reformate enhanced in octane rating, separating a fraction of said reformate boiling primarily in the range of about 350 to 410° F. cooling said separated fraction to crystallize durene, separating said crystals from the crystallization mother liquor, of aromatic hydrocarbons of 10 carbon atoms and passing said mother liquor to the reforming zone, in an amount of about 0.5 to 10% of said naphtha.
2. The process of claim 1 wherein the separated fraction of reformate boils primarily in the range of about 370 to 400° F.
3. The process of claim 2 in which the platinum metal is platinum.
4. The method of claim 3 in which said motor liquor is passed to the reforming zone in the amount of about 1 to 5% of said naphtha.

References Cited in the file of this patent
UNITED STATES PATENTS 2,848,519   Corneil et al. _____ Aug. 19, 1958
2,890,252   Cottle _____ June 9, 1959
2,910,514   Scott et al. _____ Oct. 27, 1959